United States Patent [19]

Ozaki et al.

[11] Patent Number: 4,901,595
[45] Date of Patent: Feb. 20, 1990

[54] AUXILIARY BRAKE CONTROL ASSEMBLY FOR BICYCLE

[75] Inventors: Nobuo Ozaki; Kazuyuki Miura; Toshimasa Yamazaki, all of Osaka, Japan

[73] Assignee: Maeda Industries, Ltd., Osaka, Japan

[21] Appl. No.: 86,865

[22] Filed: Aug. 19, 1987

[30] Foreign Application Priority Data

Aug. 19, 1986 [JP] Japan .................. 61-194195

[51] Int. Cl.$^4$ .............................. F16C 1/10
[52] U.S. Cl. .................... 74/502.2; 74/489; 74/501.6; 188/2 D
[58] Field of Search ............ 74/488, 489, 500.5, 74/501.6, 502.2, 523, 480 R, 551.8; 188/24.22, 2 D, 24.11, 24.18, 24.16, 24.19, 24.12

[56] References Cited

U.S. PATENT DOCUMENTS

| | | |
|---|---|---|
| 3,719,104 | 3/1973 | Dian ........................ 74/489 |
| 3,776,061 | 12/1973 | Yoshigai .................... 74/480 R |
| 3,977,270 | 8/1976 | Cristie ...................... 74/480 R |
| 4,212,363 | 7/1980 | Letner et al. ............... 74/489 X |
| 4,260,171 | 4/1981 | Foster ...................... 403/108 |
| 4,462,267 | 7/1984 | Shimano .................... 74/489 |
| 4,773,510 | 9/1988 | Sato ........................ 188/2 D |

FOREIGN PATENT DOCUMENTS

| | | | |
|---|---|---|---|
| 805843 | 5/1951 | Fed. Rep. of Germany ........ 74/488 |
| 908924 | 4/1945 | France . | |
| 909885 | 5/1946 | France ................... 74/489 |
| 988874 | 9/1951 | France ................... 74/489 |
| 1045320 | 11/1953 | France . | |
| 2169538 | 9/1973 | France . | |
| 51-50754 | 4/1976 | Japan . | |
| 8003904 | 2/1982 | Netherlands .................. 188/2 D |
| 181096 | 6/1922 | United Kingdom ............... 74/489 |
| 710443 | 6/1954 | United Kingdom ............... 74/488 |
| 906492 | 9/1962 | United Kingdom ............... 74/489 |

Primary Examiner—Rodney M. Lindsey
Attorney, Agent, or Firm—Birch, Stewart, Kolasch & Birch

[57] ABSTRACT

A bicycle auxiliary brake control assembly which is provided on a bicycle body in a path of a double type control cable extending from a brake lever assembly to a brake assembly and including an outer cable and an inner cable, the outer cable being divided into two separate sections each having a divided end, wherein the auxiliary brake control assembly comprises a fixed member engaging with the divided end of one section of the outer cable at a fixed position, and an operating member engaging with the divided end of the other section of the outer cable and movable to enlarge and reduce the distance between the divided ends of the respective sections of the outer cable.

21 Claims, 7 Drawing Sheets

AUXILIARY BRAKE CONTROL ASSEMBLY FOR BICYCLE

BACKGROUND OF THE INVENTION

1. Field of the Invention

This invention relates to a bicycle brake control assembly, and more particularly to a bicycle auxiliary brake control assembly which is provided in addition to a brake lever assembly to enable selective operation of a brake assembly either by the auxiliary brake control assembly or by the brake lever assembly.

2. Description of the Prior Art

As is well known, racing bicycles in general have a drop handle arm which includes a pair of downwardly directed curved side portions and an intermediate straight portion. In high speed riding, the cyclist grips the curved side portions of the handle arm to take a forwardly inclined riding posture, thereby minimizing aerodynamic resistance. In low speed riding, on the other hand, the cyclist grips the intermediate straight portion of the handle arm to assume a substantially upright relaxed riding posture.

Typically, the drop handle arm is provided with a pair of downwardly extending brake levers (one for the front brake and the other for the rear brake) arranged at the respective curved portions of the handle arm or with a pair of laterally extending brake levers arranged in front of the handle arm straight portion. The downwardly extending brake lever (drop lever) has a disadvantage that the cyclist must shift his hands from the handle arm straight portion to the curved portions for braking operation during low speed riding, whereas the laterally extending brake lever has an opposite problem. Such imperative shifting of the cyclist's hands causes a delay in braking operation and can sometimes put him in danger during riding.

In order to eliminate the above described problem, Japanese Utility Model application Laid-open No. 51-50754 (Laid-open: Apr. 17, 1976; application No. 49-125879; Filed: Oct. 16, 1974; Inventor: Masayoshi KINE; Applicant: Shimano Industrial Company Limited) proposes the combination of a main brake lever and an auxiliary brake lever for operating each same brake assembly. More specifically, the main brake lever is pivotally mounted to a mount bracket at each curved side portion of a drop handle arm and extends downwardly therefrom. The main brake lever is operatively connected through a double type control cable (Bowden cable) to a remote brake assembly for controlling thereof. The auxiliary brake lever is also pivotally mounted to the mount bracket but extends laterally therefrom along and in front of the handle arm intermediate straight portion. The auxiliary brake lever has an engaging portion engaging with the main brake lever in a manner such that the pivotal movement of the auxiliary brake lever causes simultaneous pivotal movement of the main brake lever.

According to this arrangement, the cyclist may selectively operate the main or auxiliary brake lever depending on a particular riding posture, consequently making it unnecessary to shift his hands for braking. However, such arrangement requires special design of the main brake lever for combination with the auxiliary brake lever. Thus, it is impossible to use an ordinary drop lever as the main brake lever, which results in cost increase. Further, the auxiliary brake lever must extend a considerable length from the mount bracket in order to provide a ready access for a cyclist's hand gripping the intermediate straight portion of the handle arm, inevitably increasing the required pivotal stroke of the auxiliary brake lever to ensure a complete braking operation.

A similar combination of a main brake lever and an auxiliary brake lever is also disclosed for example in U.S. Pat. No. 3,776,061 to Yoshigai and U.S. Pat. No. 3,977,270 to Cristie.

SUMMARY OF THE INVENTION

It is, therefore, an object of the present invention to provide a bicycle auxiliary brake control assembly which enables the use of an ordinary brake lever without any modifications and which ensures a complete braking operation with a relatively small operating stroke.

Another object of the invention is to provide a bicycle auxiliary brake control assembly which incorporates an operating member workable also as a grip on an intermediate straight portion of a handle arm.

A further object of invention is to provide a bicycle auxiliary brake control assembly incorporating an operating member which is easily operable for braking.

According to the present invention, there is provided a bicycle auxiliary brake control assembly which is provided on a bicycle body in a path of a double type control cable extending from a brake lever assembly to a brake assembly and including an outer cable and an inner cable, the outer cable being divided into two separate sections each having a divided end, the auxiliary brake control assembly comprising a fixed member engaging with the divided end of one section of the outer cable at a fixed position, and an operating member engaging with the divided end of the other section of the outer cable and movable to bring the divided end of the other section toward and away from the divided end of the one section.

According to a preferred embodiment of the invention, the operating member is in the form of a grip rotatably fitted on a straight portion of a handle arm.

According to a further advantageous arrangement, the grip has a projecting rest portion which preferably extends rearwardly of the bicycle body to provide a palm support for facilitating operation (rotation) of the grip.

Other objects, features and advantages of the invention will be readily understood from the following description of the preferred embodiments given with reference to the accompanying drawing.

DESCRIPTION OF THE PREFERRED EMBODIMENTS

Figure 1:
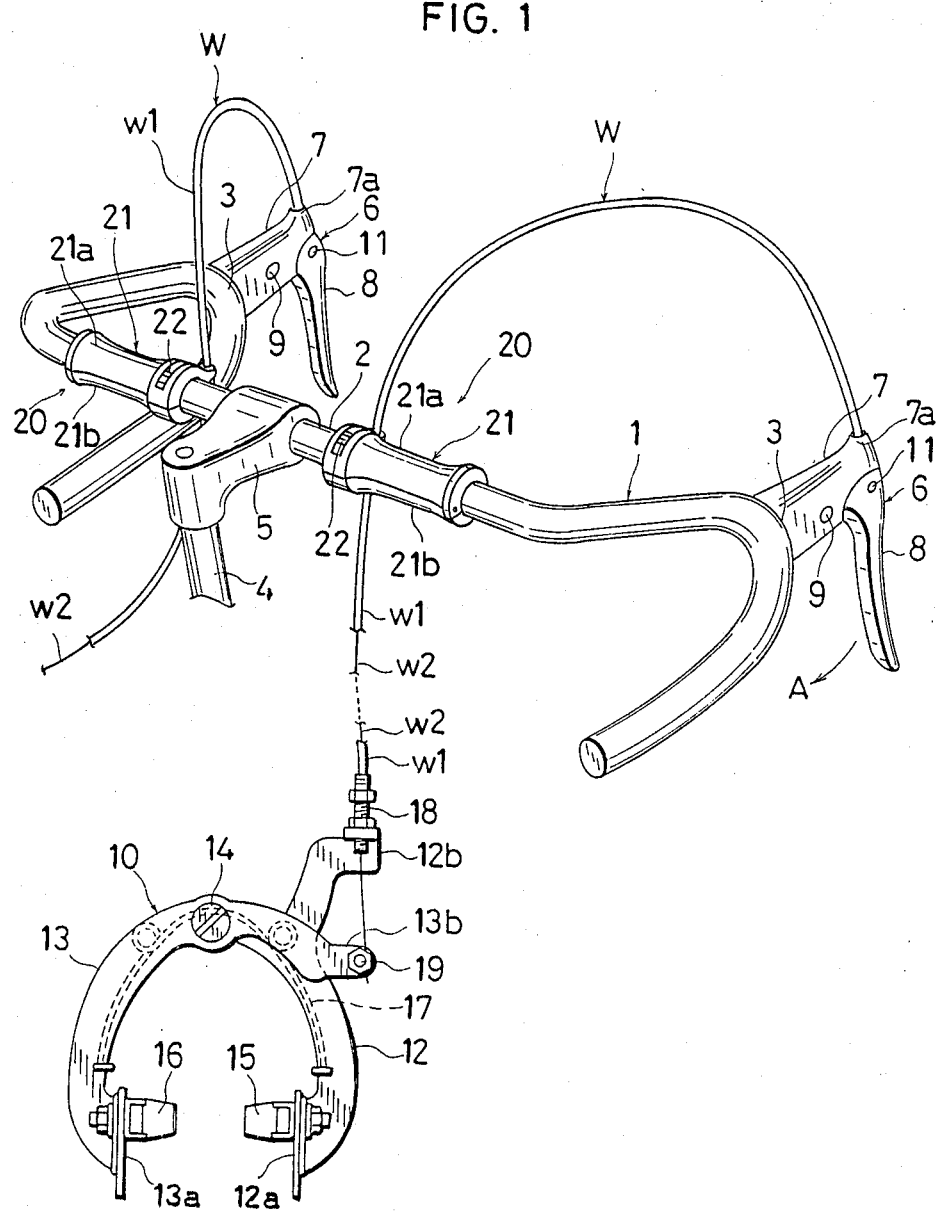
FIG. 1 is a perspective view showing a bicycle drop handle arm on which are mounted a pair of auxiliary brake control assemblies embodying the invention.

Referring now to FIG. 1 of the accompanying drawings, there is illustrated a drop handle arm 1 which has an intermediate straight portion 2 and a pair of downwardly directed curved side portions 3 to give a well known appearance of the drop handle. The straight portion 2 of the handle arm 1 is mounted at its center to a handle stem 4 by means of a handle lug 5. The handle arm 1 and the handle stem 4 form part of a bicycle body.

Each side portion 3 of the handle arm 1 is provided with a brake lever assembly 6 which comprises a forwardly extending mount bracket 7 and a downwardly extending brake lever 8 (drop lever) pivotally mounted to the bracket 7 by a pivot 9.

The brake lever assembly 6 is connected through a double type control cable W to a corresponding brake assembly 10 (only one shown, the other being substantially identical in configuration). More specifically, the control cable W consists of an outer cable w1 having one end connected to an upwardly directed receiving portion 7a of the mount bracket 7, and an inner cable w2 having one end connected to the brake lever 8 at 11.

The illustrated brake assembly 10 is in the form of a well known side pull type caliper brake which includes a pair of calipers 12, 13 pivotally mounted on a common support shaft 14. Both calipers 12, 13 respectively have lower shoe mounting portions 12a, 13a on which are mounted a pair of inwardly directed brake shoes 15, 16 in mutually facing relation. The calipers 12, 13 are always urged by a return spring 17 so that the respective shoes 12a, 13a are moved away from each other. One caliper 12, which is generally Y-shaped, has a connecting portion 12b connected to the other end of the outer cable w1 by means of an adjustable screw device 18. Similarly, the other caliper 13, which is generally C-shaped, has a connecting portion 13b connected to the other end of the inner cable w2 by means of a clamping bolt 19.

According to the above arrangement, which per se is conventional and does not feature the present invention, the inner cable w2 of the double type control cable W is subjected to tension, while the outer cable w1 is subjected to compression. When the brake lever 8 is pivoted in the direction of an arrow A in FIG. 1, the inner cable w2 is moved relative to the outer cable w1 to pivot the calipers 12, 13 against the urging force of the return spring 17, thereby bringing the respective brake shoes 15, 16 toward each other into braking contact with the sides of a bicycle wheel rim (not shown). Upon liberation of the brake lever 8, on the other hand, the spring 17 functions to return the calipers 12, 13 to their respective non-braking position.

According to the present invention, each brake lever assembly 6 is associated with an auxiliary brake control assembly 20 which is mounted on the intermediate straight portion 2 of the handle arm 1 on a corresponding side of the handle lug 5. The auxiliary brake control assembly 20 is used to control the corresponding caliper brake assembly 10 during riding with the cyclist's hands gripping the intermediate straight portion 2 of the handle arm 1.

The auxiliary brake control assembly 20 on each side of the handle lug 5 comprises a generally cylindrical grip 21 which is rotatably fitted on the handle arm intermediate straight portion 2, and a fixed member 22 which is non-rotatably mounted to the straight portion 2 adjacent to the handle lug 5.

Figure 2:
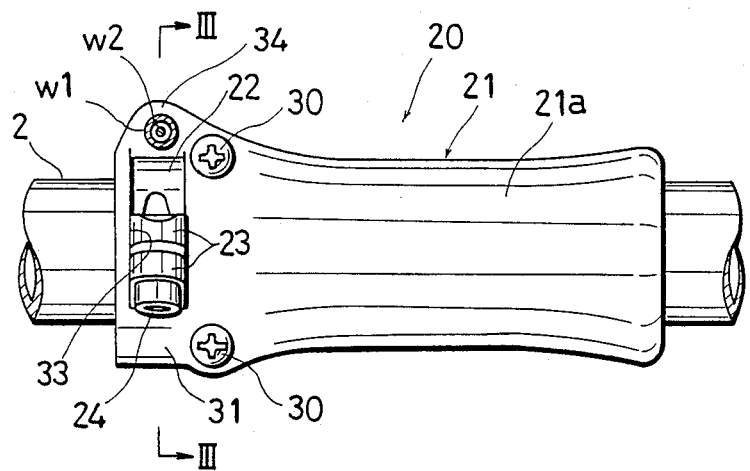
FIG. 2 is an enlarged top plan view showing each auxiliary brake control assembly.
Figure 3:
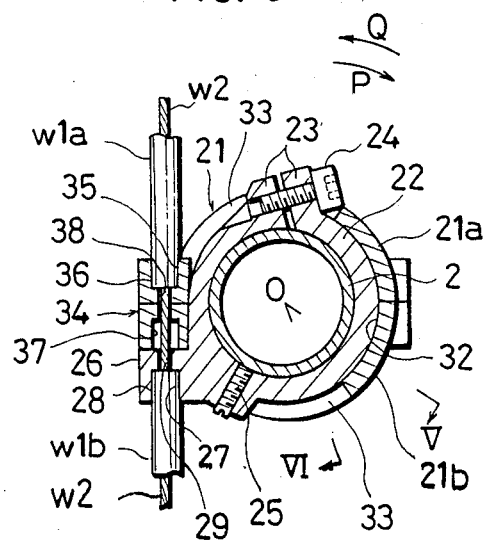
FIG. 3 is a sectional view taken on lines III—III in FIG. 2.

According to the example illustrated in FIGS. 2 and 3, the fixed member 22 is in the form of a split ring having a pair of slightly spaced but opposed end flanges 23. The split ring 22 may be brought to its assigned position by moving it from a corresponding end of the handle arm 1 past the curved side portion 3. The ring 22 is non-rotatably clamped by a bolt 24 screwed to the end flanges 23. If required, a set screw 25 penetratable through the wall thickness of the ring 22 may be used to more reliably prevent the rotation of the ring 22.

As illustrated in FIG. 3, the outer cable w1 of the double type control cable W is divided into two separate sections, that is, a first section w1a and a second section w1b. The purpose of such division of the outer cable w1 will be described hereinafter.

The fixed ring 22 is further provided with a forwardly projecting non-movable engaging portion 26. The engaging portion 26 is formed with a bottomed larger diameter hole 27 for receiving the divided end 28 of the second section w1b of the outer cable w1 as well as with a smaller diameter through-hole 29 for passage of the inner cable w2.

The grip 21 consists of two cylinder halves 21a, 21b joined together into a cylindrical form by means of screws 30. Such divisible construction of the grip 21 is preferred because an integral cylinder cannot pass over a corresponding curved portion 3 of the handle arm 1 for assembly and disassembly of the grip.

Figure 5:
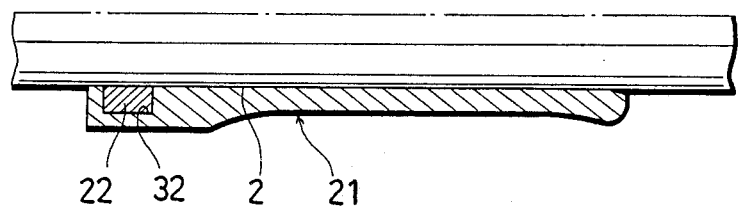
FIG. 5 is a sectional view taken on lines O—V in FIG. 3.
Figure 6:
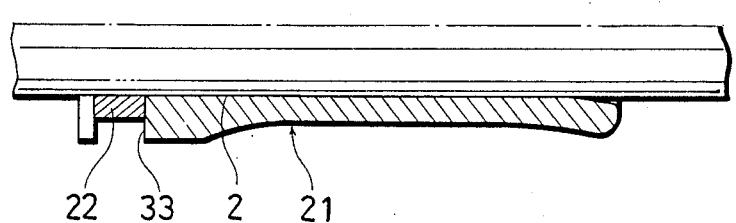
FIG. 6 is a sectional view taken on lines O—VI in FIG. 3.

The cylindrical grip 21 has an enlarged inner end portion 31 fitted over the fixed ring 22, and extends therefrom laterally outwardly for a sufficient length to provide a proper grip for a cyclist's hand. The enlarged inner end portion 31 is internally provided with an annular groove 32 receiving the fixed ring 22, as illustrated in FIGS. 3 and 5. The end portion 31 is further provided with a pair of penetrating arcuate cutouts 33 (FIGS. 3 and 6) through which respectively project out the end flanges 23 and engaging portion 26 of the split ring 22.

As readily appreciated, the annular groove 32 and the arcuate cutouts 33 in combination serve to prevent lateral displacement of the grip 21 by their engagement with the fixed ring 22. The circumferential length of the respective cutouts 33 is such as to allow limited rotation of the grip 21 relative to the fixed ring 22.

The enlarged end portion 31 of the grip 21 is further provided with a forwardly projecting movable engaging portion 34 which is positioned above and opposed to the non-movable engaging portion 26. The movable engaging portion 34 is formed with a bottomed larger diameter hole 35 for reception on the divided end 36 of the first section w1a of the outer cable w1 as well as with a stepped through hole 37 including a smaller diameter portion 38 for passage of the inner cable w2 alone. The stepped configuration of the through-hole 37 is preferred to avoid unacceptable deformation of the inner cable w2 upon limited rotation of the grip 21 (see FIG. 4). However, such stepped configuration is not absolutely required, and the stepped through-hole 37 may be replaced by a non-stepped smaller diameter through-hole.

With the construction described above, the two divided sections w1a, w1b of the outer cable w1 are always held under compression by the action of the return spring (FIG. 1), so that the movable engaging portion 34 of the grip 21 is normally maintained in contact with the non-movable engaging portion 26 of the fixed ring 22 (FIG. 3) to prevent further reduction in length of the outer cable w1 as a whole. Under this condition, manual actuation and liberation of the brake lever 8 (FIG. 1) causes movement of the inner cable w2 relative to the outer cable w1 to bring the brake shoes 15, 16 respectively into and out of braking contact with the bicycle wheel rim (not shown), as already described hereinbefore.

Figure 4:
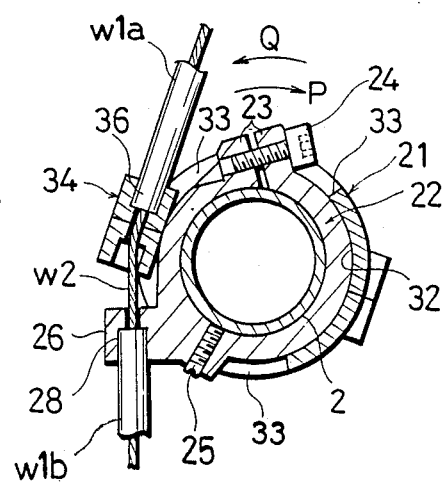
FIG. 4 is a sectional view similar to FIG. 3 but illustrating the auxiliary brake control assembly in a braking position.

When the grip 21 is manually rotated in the direction of an arrow P in FIG. 4, the engaging portion 34 of the grip 21 is forcibly moved away from the non-movable engaging portion 26 of the fixed ring 22 to enlarge the effective length of the outer cable w1, whereas the length of the inner cable w2 remains unchanged. Such elongation of the outer cable w1 alone is equivalent to pulling up the inner cable w2 relative to the outer cable w1 by the actuation of the brake lever 8 (FIG. 1), thereby bringing the brake shoes 15, 16 of the caliper brake assembly 10 into braking contact with the bicycle wheel rim (not shown) against the biasing force of the return spring 17.

When the grip 21 is freed of manual rotational force, it is automatically rotated under compression of the outer cable sections w1a, w1b in the direction of an arrow Q in FIG. 4 to bring the brake shoes 15, 16 (FIG. 1) out of contact with the bicycle wheel rim (not shown) and to enable braking operation by use of the brake lever 8.

In this way, it is possible to operate caliper brake assembly 10 either by means of the brake lever assembly 6 during high speed riding (forwardly inclined riding posture) with the cyclist's hands gripping the curved side portions 3 of the handle arm 1 or by means of the auxiliary brake control assembly 20 during low speed riding (upright riding posture) with his hands grasping the grips 21.

Each grip 21 is arranged at a position where the cyclist manually grasps the handle arm 1 in substantially upright riding posture. Further, mere rotation of the grip 21 causes actuation of the caliper brake assembly 10. Therefore, the cyclist needs not shift nor open his hand to operate a corresponding auxiliary brake control assembly 20, consequently ensuring quick braking operation.

Apparently, the auxiliary brake control assembly 20 of the present invention has no problem of a large operating stroke which is inherent with the formerly described conventional auxiliary brake lever.

It should be noted that the provision of the auxiliary brake control assembly 20 requires only the division of the outer cable w1 into the two sections w1a, w1b and the addition of the grip 21 and the fixed ring 22, but calls for no modification in design of the brake lever 8. Thus, it is possible to use a conventional type brake lever, thereby contributing to cost reduction.

It should be appreciated that the advantages of the present invention can be obtained as long as the effective overall length of the divided outer cable w1 is variable by operating a control member, such as a rotatable grip, which is mounted at a suitable portion of the bicycle body.

FIGS. 7 to 12 illustrate another modified auxiliary brake control assembly. In these Figures, all parts other than the auxiliary brake control assembly are referred to by the same reference numerals and characters as those which are already used in FIGS. 1 to 6 in order to avoid unnecessary duplication of explanation.

Referring to FIGS. 7 to 12, the modified auxiliary brake control assembly 50 provided on each side of the handle lug 5 comprises a non-cylindrical grip 51 which is rotatably fitted on the intermediate straight portion 2 of the handle arm 2, and a fixed member 52 which is non-rotatably mounted to the handle arm straight portion 2 adjacent to the handle lug 5.

Figure 9:
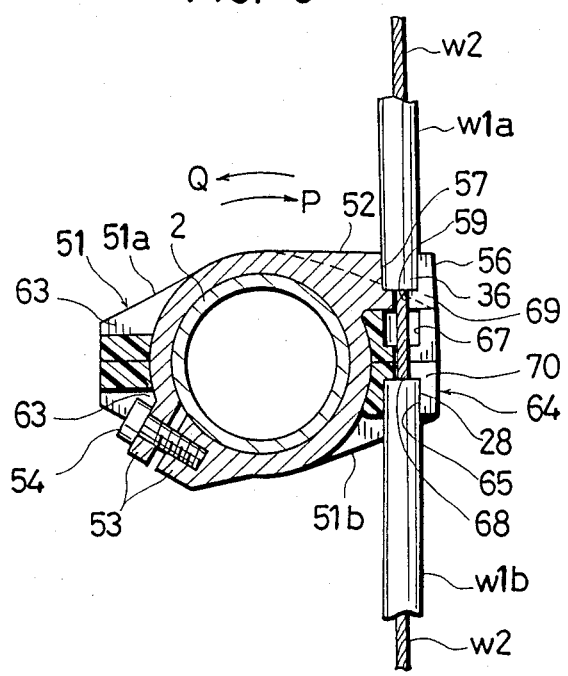
FIG. 9 is a sectional view taken on lines IX—IX in FIG. 8.
Figure 10:
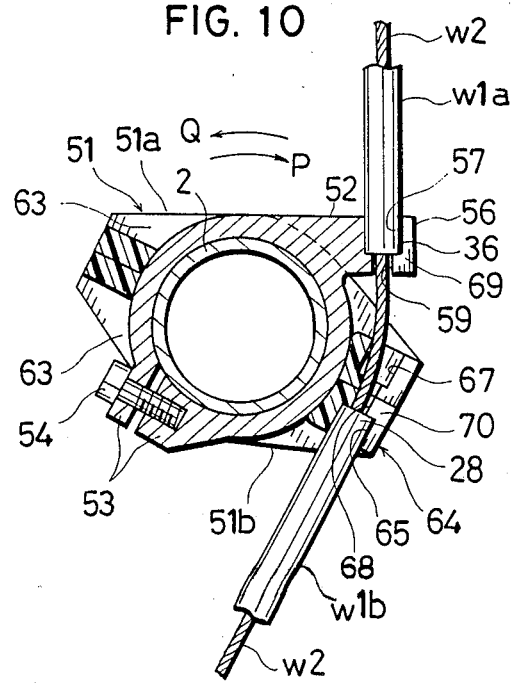
FIG. 10 is a sectional view similar to FIG. 9 but showing the auxiliary brake control assembly of FIG. 7 in a braking position.

As appreciated from FIG. 9, the fixed member is in the form of a split ring provided with a pair of slightly spaced but opposed end flanges 53 and non-rotatably clamped onto the handle arm straight portion 2 by means of a bolt 54 screwed to the end flanges. The fixed ring 52 is further provided with a rearwardly projecting non-movable engaging portion 56. The engaging portion 56 is formed with a bottomed larger diameter hole 57 for receiving the divided end 36 of the first section w1a of the outer cable w1 as well as with a smaller diameter through-hole 59 for passage of the inner cable w2 alone.

Figure 8:
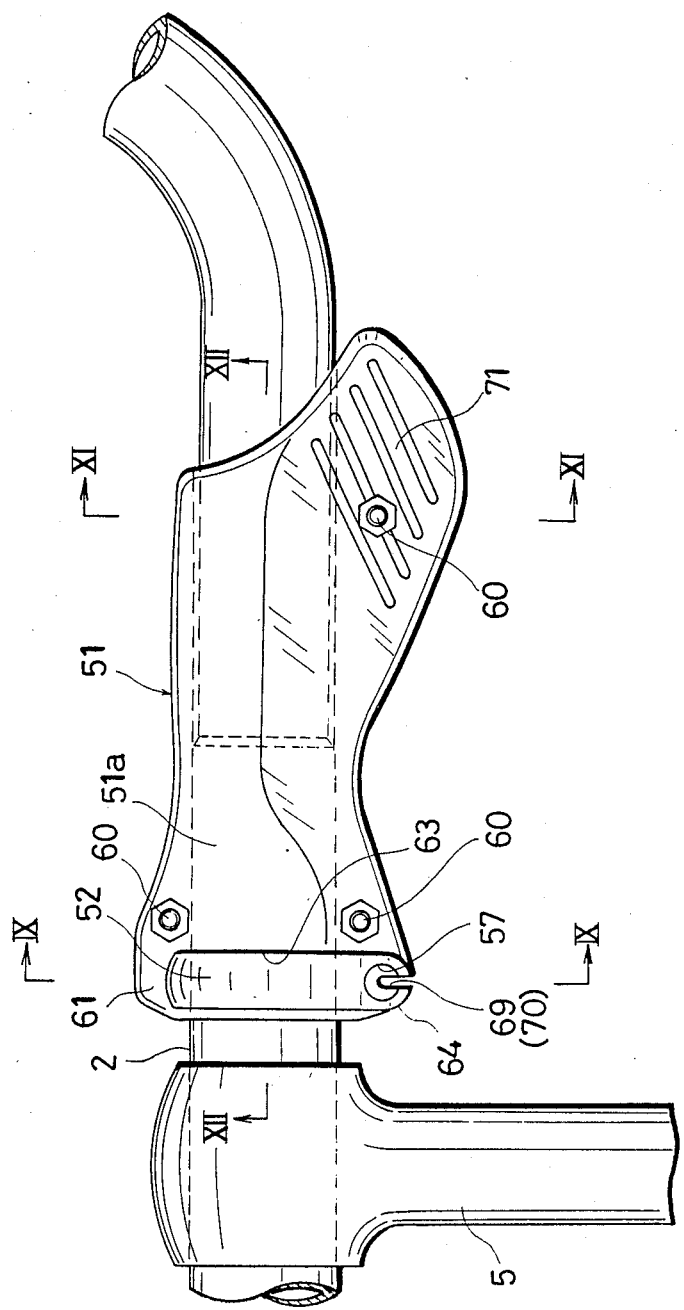
FIG. 8 is an enlarged top plan view showing each auxiliary brake control assembly of FIG. 7.

The grip 51 consists of substantially identical two halves 51a, 51b joined together into a specially shaped unit by means of screws and/or bolts 60 (FIG. 8).

The grip 51 has an inner end portion 61 fitted over the fixed ring 52, and extends therefrom laterally outwardly for a sufficient length to provide a proper grip for a cyclist's hand. The inner end portion 61 is provided with a pair of penetrating cutouts 63 (FIGS. 8, 9 and 12) through which respectively project out the end flanges 53 and engaging portion 56 of the split ring 52 and which serves to prevent lateral displacement of the grip 51 and to allow limited rotation of the grip 51 relative to the fixed ring 52.

The end portion 61 of the grip 51 is further provided with a rearwardly projecting movable engaging portion 64 which is positioned below and opposed to the non-movable engaging portion 56 of the fixed ring 52. The movable engaging portion 64 is formed with a bottomed larger diameter hole 65 for reception of the divided end 28 of the second section w1b of the outer cable w1 as well as with a stepped through-hole 67 including a smaller diameter portion 68 for passage of the inner cable w2 alone.

Figure 7:
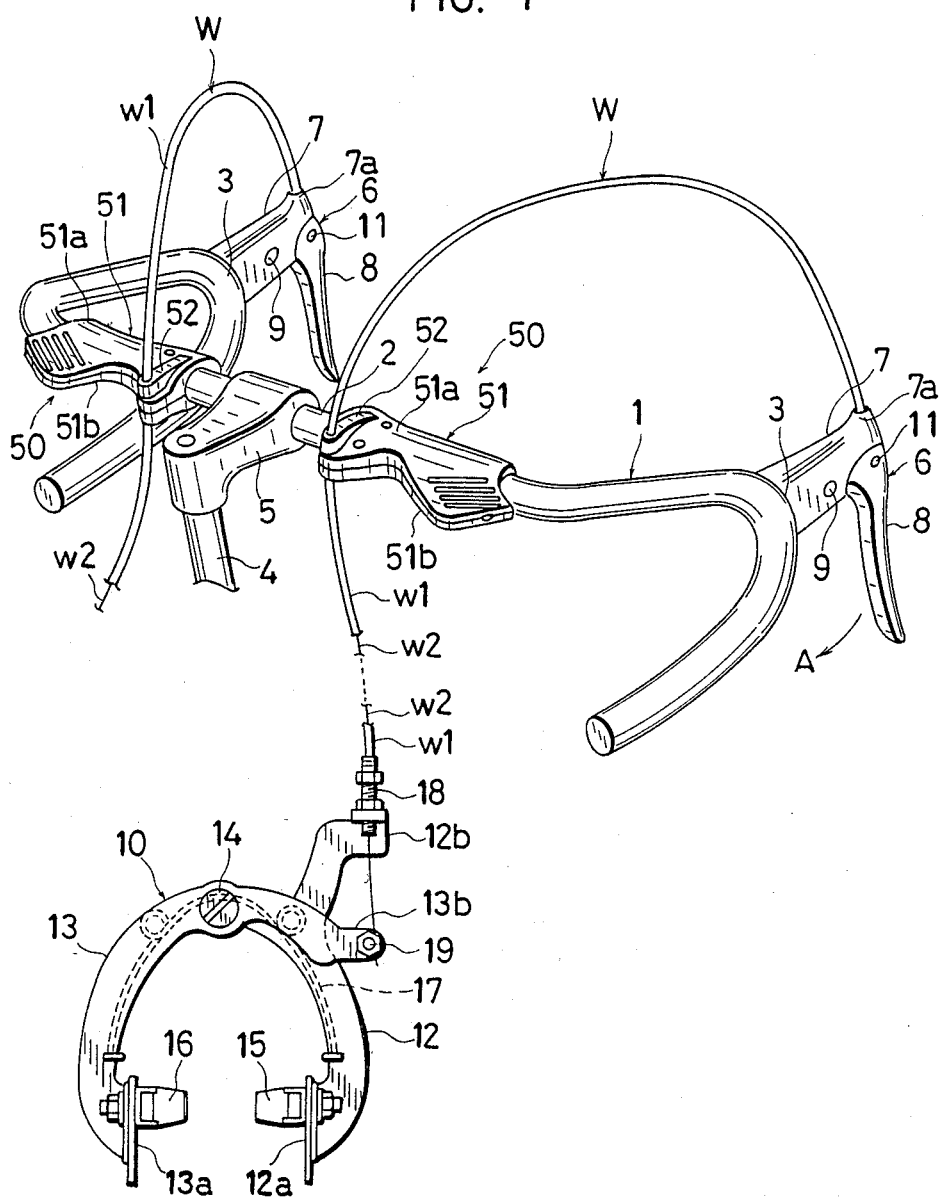
FIG. 7 is a perspective view similar to FIG. 1 but showing a drop handle arm provided with another pair of auxiliary brake control assemblies embodying the invention.

Preferably, the non-movable engaging portion 56 of the fixed ring 52 and the movable engaging portion 64 of the grip 51 are respectively formed with rearwardly open slots or notches 69, 70 (FIGS. 8 and 9) to facilitate mounting thereto of the double type control cable W (FIG. 7).

Figure 11:
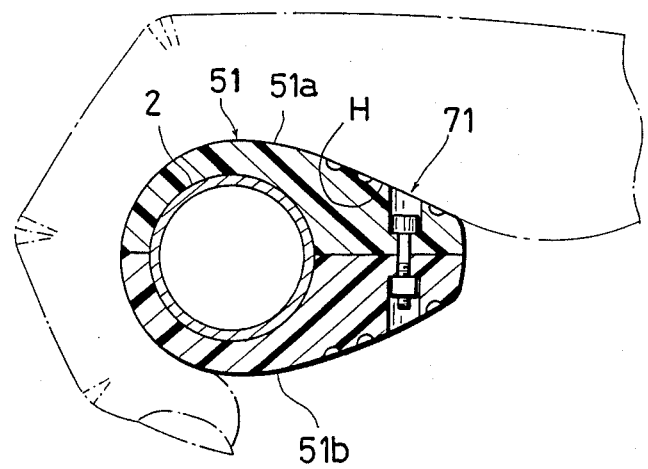
FIG. 11 is a sectional view taken on lines XI—XI in FIG. 8.
Figure 12:
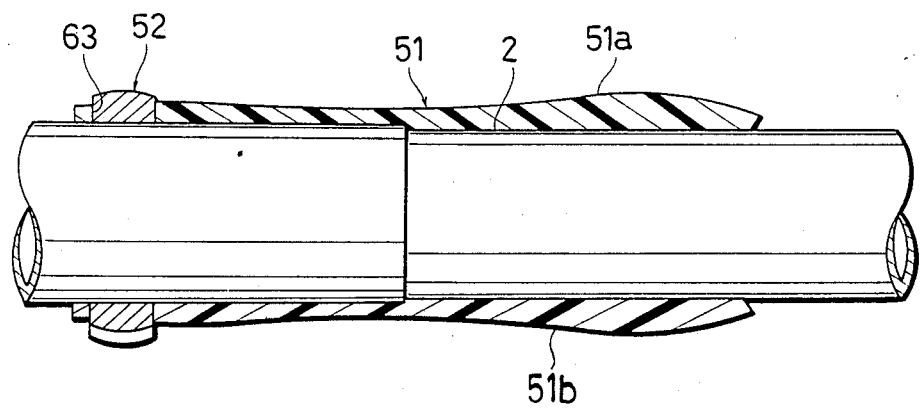
FIG. 12 is a sectional view taken on lines XII—XII in FIG. 8.

Further, the grip 51 has a rearwardly projecting palm rest 71 on which is supported a cyclist's palm H, as illustrated in FIG. 11. This palm rest facilitates rotation of the grip 51 for braking.

The thus modified auxiliary brake control assembly 50 operates in substantially the same manner as the embodiment of FIGS. 1 to 6, except that the divided end 28 of the outer cable second section w1b is movable together with the grip 51.

The invention being thus described, it is obvious that the same may be varied in many ways. For instance, the auxiliary brake control assembly may be arranged at a location other than the intermediate straight portion 2 of the handle arm 1, and the handle arm may or may not be of the dropped type. Further, the operating member of the auxiliary brake control assembly may not be in the form of a grip. Such variations should not be regarded as a departure from the spirit and scope of the invention, and all such modifications as would be obvious to those skilled in the art are intended to included within the scope of the following claims.

We claim:

1. A bicycle brake control system for a bicycle dropped handlebar, said handlebar including a pair of dropped side portions, and an intermediate straight portion extending between said pair of dropped side portions and centrally supported by a bicycle handle stem, said straight portion having first and second portions separated by said bicycle handle stem, said control system comprising:
   a main brake control assembly mounted on each of said dropped side portions and connected to a remote brake assembly through a double type control cable, said double type control cable including an inner cable guided in an outer cable, said outer cable being divided into two separate sections each having a divided end; and
   an auxiliary brake control assembly associated with said main brake control assembly and acting on said divided outer cable;
   wherein said auxiliary brake control assembly comprises:
   a fixed member engaging with the divided end of one section of said outer cable at a fixed position;
   an operating grip rotatably fitted on each of said first and second portions of said intermediate straight portion and engaging with the divided end of the other section of said outer cable to bring said divided end of said other section toward and away from the divided end of said one section upon rotation of said grip;
   said fixed member is in the form of a ring fixed on said straight portion of said handlebar and having a projecting non-movable engaging portion for engagement with the divided end of said one section of said outer cable while allowing passage therethrough of said inner cable; and
   said grip has a projecting movable engaging portion opposed to said non-movable engaging portion of said ring for engagement with the divided end of said other section while allowing passage therethrough of said inner cable, said movable engaging portion coming into surface contact with said non-movable engaging portion when said grip assumes a non-braking rotational position.

2. The brake control system as defined in claim 1, wherein said grip has an end portion fitted over said ring and having a cutout through which projects out said non-movable engaging portion of said ring, said cutout allowing limited rotation of said grip relative to said ring.

3. The brake control system as defined in claim 2, wherein said end portion of said grip is internally formed with an annular groove for accommodating said ring.

4. The brake control system as defined in claim 2, wherein said ring is split at one circumferential location and has a pair of end flanges opposed to each other at a slight spacing and clamped together by a clamping bolt, and said end portion of said grip further has a second cutout through which project out said end flanges of said ring, said second cutout allowing limited rotation of said grip relative to said ring.

5. The brake control system as defined in claim 1, wherein said non-movable engaging portion of said ring is formed with a bottomed hole for receiving the divided end of said one section of said outer cable as well as with a through-hole in communication with said bottomed hole for passage therethrough of said inner cable, and said movable engaging portion of said grip is formed with another bottomed hole for receiving the divided end of said other section of said outer cable as well as with another through-hole in communication with said other bottomed hole for passage therethrough of said inner cable.

6. The brake control system as defined in claim 5, wherein said non-movable engaging portion and said movable engaging portion are respectively formed with slots for facilitating introduction of said inner cable into their respective through-holes.

7. The brake control system as defined in claim 1, wherein said grip comprises two separate halves joined together to rotatably fit on said straight portion of said handlebar.

8. The brake control system as defined in claim 1, wherein said grip is generally cylindrical.

9. The brake control system as defined in claim 1, wherein said grip has a projecting rest portion.

10. The brake control system as defined in claim 9, wherein said rest portion of said grip projects rearwardly and laterally outwardly toward a corresponding side portion of said handlebar to serve as a palm rest.

11. The brake control system as defined in claim 1, wherein said fixed member is in the form of a split ring having a pair of end flanges opposed to each other at a slight spacing and clamped together by a clamping bolt.

12. A bicycle brake control system for a bicycle dropped handlebar, said handlebar including a pair of dropped side portions, and an intermediate straight portion extending between said pair of dropped side portions and centrally supported by a bicycle handle stem, said straight portion having first and second portions separated by said bicycle handle stem, said control system comprising:
   a main brake control assembly mounted on each of said dropped side portions and connected to a remote brake assembly through a double type control cable, said double type control cable including an inner cable guided in an outer cable, said outer cable being divided into two separate sections each having a divided end; and
   an auxiliary brake control assembly associated with said main brake control assembly and acting on said divided outer cable;
   wherein said auxiliary brake control assembly comprises:
   a fixed member engaging with the divided end of one section of said outer cable at a fixed positon; and an operating grip located on each of said first and second portions and having a mounting bore for rotatably fitting on said intermediate portion and engaging with the divided end of the other section of said outer cable to bring said divided end of said other section toward and away from the divided end of said one section upon rotation of said grip, said grip having a rearwardly projecting palm rest portion which also projects laterally outwardly beyond said mounting bore toward a corresponding side portion of said handlebar.

13. The brake control system as defined in claim 12, wherein said fixed member is in the form of a ring fixed on said straight portion of said handlebar and having a projecting non-movable engaging portion for engagement with the divided end of said one section of said outer cable while allowing passage therethrough of said inner cable.

14. The brake control system as defined in claim 13, wherein said grip has a projecting movable engaging portion opposed to said non-movable engaging portion of said ring for engagement with the divided end of said other section while allowing passage therethrough of said inner cable, said movable engaging portion coming into surface contact with said non-movable engaging portion when said grip assumes a non-braking rotational position.

15. The brake control system as defined i claim 14, wherein said grip has an end portion fitted over said ring and having a cutout through which projects out said non-movable engaging portion of said ring, said cutout allowing limited rotation of said grip relative to said ring.

16. The brake control system as defined in claim 15, wherein said end portion of said grip is internally formed with an annular groove for accommodating said ring.

17. The brake control system as defined in claim 15, wherein said ring is split at one circumferential location and has a pair of end flanges opposed to each other at a slight spacing and clamped together by a clamping bolt, and said end portion of said grip further has a second cutout through which project out said end flanges of said ring, said second cutout allowing limited rotation of said grip relative to said ring.

18. The brake control system as defined in claim 14, wherein said non-movable engaging portion of said ring is formed with a bottomed hole for receiving the divided end of said one section of said outer cable as well as with a through-hole in communication with said bottomed hole for passage therethrough of said inner cable, and said movable engaging portion of said grip is formed with another bottomed hole for receiving the divided end of said other section of said outer cable as well as with another through-hole in communication with said other bottomed hole for passage therethrough of said inner cable.

19. The brake control system as defined in claim 18, wherein said non-movable engaging portion and said movable engaging portion are respectively formed with slots for facilitating introduction of said inner cable into their respective through-holes.

20. The brake control system as defined in claim 12, wherein said grip comprises two separate halves joined together to rotatably fit on said straight portion of said handlebar.

21. The brake control system as defined in claim 12, wherein said fixed member is in the form of a split ring having a pair of end flanges opposed to each other at a slight spacing and clamped together by a clamping bolt.

* * * * *